US012726689B2

(12) United States Patent
Chang et al.

(10) Patent No.: US 12,726,689 B2
(45) Date of Patent: Sep. 1, 2026

(54) ELECTRONIC DEVICE WITH ELECTROSTATIC PROTECTION

(71) Applicant: Quanta Computer Inc., Taoyuan City (TW)

(72) Inventors: Jung-Tang Chang, Kuei Shan Dist. (TW); Wen-Shu Lee, Kuei Shan Dist (TW); Shao-Chi Chuang, Kuei Shan Dist. (TW)

(73) Assignee: Quanta Computer Inc., Taoyuan City (TW)

( * ) Notice: Subject to any disclaimer, the term of this patent is extended or adjusted under 35 U.S.C. 154(b) by 183 days.

(21) Appl. No.: 18/760,729

(22) Filed: Jul. 1, 2024

(65) Prior Publication Data

US 2025/0317636 A1 Oct. 9, 2025

(30) Foreign Application Priority Data

Apr. 9, 2024 (TW) ................................ 113203433

(51) Int. Cl.
*H04N 23/51* (2023.01)
*H04N 23/55* (2023.01)
*H04N 23/57* (2023.01)

(52) U.S. Cl.
CPC ............ *H04N 23/51* (2023.01); *H04N 23/55* (2023.01); *H04N 23/57* (2023.01)

(58) Field of Classification Search
CPC ........ H04N 23/51; H04N 23/52; H04N 23/55; H04N 23/57
See application file for complete search history.

(56) References Cited

U.S. PATENT DOCUMENTS

| | | | | |
|---|---|---|---|---|
| 9,179,052 | B2 * | 11/2015 | Lee | H04N 23/51 |
| 11,856,697 | B2 * | 12/2023 | Kim | G03B 11/04 |
| 2015/0109526 | A1 * | 4/2015 | Lee | H04N 23/54 348/374 |
| 2017/0214888 | A1 * | 7/2017 | Bai | H04N 23/51 |
| 2018/0267390 | A1 * | 9/2018 | Kim | H04N 23/52 |
| 2021/0006876 | A1 * | 1/2021 | Moon | G06F 1/1688 |
| 2021/0151425 | A1 * | 5/2021 | Kim | H04M 1/0264 |
| 2022/0294949 | A1 * | 9/2022 | Li | G02F 1/155 |
| 2023/0236478 | A1 * | 7/2023 | Lee | G03B 17/55 348/373 |

FOREIGN PATENT DOCUMENTS

| | | | | |
|---|---|---|---|---|
| KR | 20150066700 A | * | 6/2015 | G03B 17/08 |

* cited by examiner

*Primary Examiner* — Antoinette T Spinks

(57) ABSTRACT

An electronic device includes a housing, a camera module and an insulating sleeve. The housing includes an installation opening and an internal space connected to the installation opening. The camera module is located within the installation opening and the internal space and exposed from the installation opening. The insulating sleeve is surroundingly covered an outer surface of the camera module and located between the camera module and the housing for blocking a communication between the internal space and the installation opening.

11 Claims, 3 Drawing Sheets

ELECTRONIC DEVICE WITH ELECTROSTATIC PROTECTION

RELATED APPLICATIONS

This application claims the benefit of Taiwan Application Serial Number 113203433 filed on Apr. 9, 2024, which is herein incorporated by reference in its entirety.

BACKGROUND

Field of Invention

The present disclosure relates to an electronic device. More particularly, the present disclosure relates to an electronic device with electrostatic protection.

Description of Related Art

Generally, electronic devices, such as tablets, laptops and mobile phones, are often attacked by electrostatic discharge (ESD) so as to cause malfunctions, thereby affecting the productivity and product reliability of the electronic device. In this way, before the shipment of electronic devices, an ESD test is needed to be performed on the electronic devices so as to reduce the risks of these electronic devices being attacked by ESD.

However, when the ESD test is performed on each of the electronic devices with a camera module, static electricity will go through the gap between the camera module and the housing of the electronic device, thereby damaging the electronic elements of the camera module within the housing so as to cause image abnormalities.

Thus, the above-mentioned technology obviously still has inconveniences and defects, which are issues that the industry needs to solve urgently.

SUMMARY

One aspect of the present disclosure is to provide an electronic device for solving the difficulties mentioned above in the prior art.

In one embodiment of the present disclosure, an electronic device provided includes a housing, a camera module and an insulating sleeve. The housing includes an installation opening and an internal space connected to the installation opening. The camera module is located within the installation opening and the internal space, and exposed from the installation opening. The insulating sleeve is surroundingly covered an outer surface of the camera module and located between the camera module and the housing for blocking a communication between the internal space and the installation opening.

According to one or more embodiments of the present disclosure, the camera module includes a photosensitive assembly, a support assembly and a lens set. The photosensitive assembly is fixed within the internal space. The support assembly is non-conductive, and is located within the installation opening and the internal space. The lens set is supported and positioned by the support assembly so that the lens set is optically coupled to the photosensitive assembly and exposed from the installation opening.

According to one or more embodiments of the present disclosure, the support assembly is formed with a penetrating channel therein, and the lens set includes a plurality of lenses sequentially stacked and positioned within the penetrating channel and arranged along an optical axis of the photosensitive assembly.

According to one or more embodiments of the present disclosure, the support assembly includes a front cover, a bottom cover and a sleeve body. The front cover is located within the installation opening. The bottom cover covers the photosensitive assembly. The sleeve body is connected to the front cover and the bottom cover. The insulating sleeve is jacketed on the front cover and the bottom cover and abutted against the bottom cover and an inner surface of the housing, respectively.

According to one or more embodiments of the present disclosure, the lens set includes a first lens, a second lens, a third lens, a fourth lens, a fifth lens and a sixth lens, which are sequentially stacked within the support assembly. The first lens, the second lens, the third lens, the fourth lens, the fifth lens and the sixth lens are sequentially stacked within the sleeve body, and the first lens is exposed from one end of the sleeve body.

According to one or more embodiments of the present disclosure, the housing includes a first casing, a second casing and a protrusion portion. The second casing is combined with the first casing together to define the internal space therein. The protrusion portion protrudes from one side of the second casing facing away from the first casing. The installation opening penetrates through the protrusion portion longitudinally.

According to one or more embodiments of the present disclosure, the insulating sleeve is located within the internal space to directly cover an inner surface of the housing and a gap formed between the front cover and an inner wall of the protrusion portion.

According to one or more embodiments of the present disclosure, the insulating sleeve is located within the installation opening and sandwiched between the front cover and an inner wall of the protrusion portion.

According to one or more embodiments of the present disclosure, the support assembly is a plastic product.

According to one or more embodiments of the present disclosure, the insulating sleeve is one of a rubber O-ring, a silicone O-ring, and a plastic O-ring.

In one embodiment of the present disclosure, an electronic device provided includes a housing, a protrusion portion, a camera module and an electrostatic protection collar. The housing includes an installation opening and an internal space connected to the installation opening. The protrusion portion protrudes from an outer side of the housing, and the installation opening penetrates through the protrusion portion longitudinally. The electrostatic protection collar is located within the internal space. The camera module is located within the internal space, and disposed within a through hole of the electrostatic protection collar and the installation opening, and exposed from the installation opening. A gap formed between the protrusion portion and the camera module is directly covered by the electrostatic protection collar for blocking a communication between the internal space and the installation opening.

According to one or more embodiments of the present disclosure, the camera module includes a photosensitive assembly, a support assembly and a lens set. The photosensitive assembly is fixed within the internal space. The support assembly is non-conductive, and is located within the installation opening and the internal space. The lens set is supported and positioned by the support assembly so that the lens set is optically coupled to the photosensitive assembly and exposed from the installation opening.

According to one or more embodiments of the present disclosure, the support assembly is formed with a penetrating channel therein, and the lens set includes a plurality of lenses sequentially stacked and positioned within the penetrating channel and arranged along an optical axis of the photosensitive assembly.

According to one or more embodiments of the present disclosure, the support assembly includes a front cover, a bottom cover and a sleeve body. The front cover is located within the installation opening. The bottom cover covers the photosensitive assembly. The sleeve body is connected to the front cover and the bottom cover. The electrostatic protection collar is jacketed on the front cover and the bottom cover and abutted against the bottom cover and an inner surface of the housing, respectively.

According to one or more embodiments of the present disclosure, the support assembly includes a front cover, a bottom cover and a sleeve body. The front cover is located within the installation opening. The bottom cover covers the photosensitive assembly. The sleeve body is connected to the front cover and the bottom cover. The electrostatic protection collar is jacketed on the front cover and the bottom cover and abutted against the bottom cover and an inner surface of the housing, respectively.

According to one or more embodiments of the present disclosure, the electrostatic protection collar is located within the installation opening and sandwiched between the front cover and an inner wall of the protrusion portion.

According to one or more embodiments of the present disclosure, the housing includes a first casing, a second casing and a protrusion portion. The second casing is combined with the first casing together to define the internal space therein. The protrusion portion protrudes from one side of the second casing facing away from the first casing. The installation opening penetrates through the protrusion portion longitudinally.

Thus, through the construction of the embodiments above, the electronic device of the disclosure is not only waterproof and dustproof, but also can reduce static electricity from entering the interior of the electronic device during ESD testing, thereby slowing down the damage to internal electronic elements.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
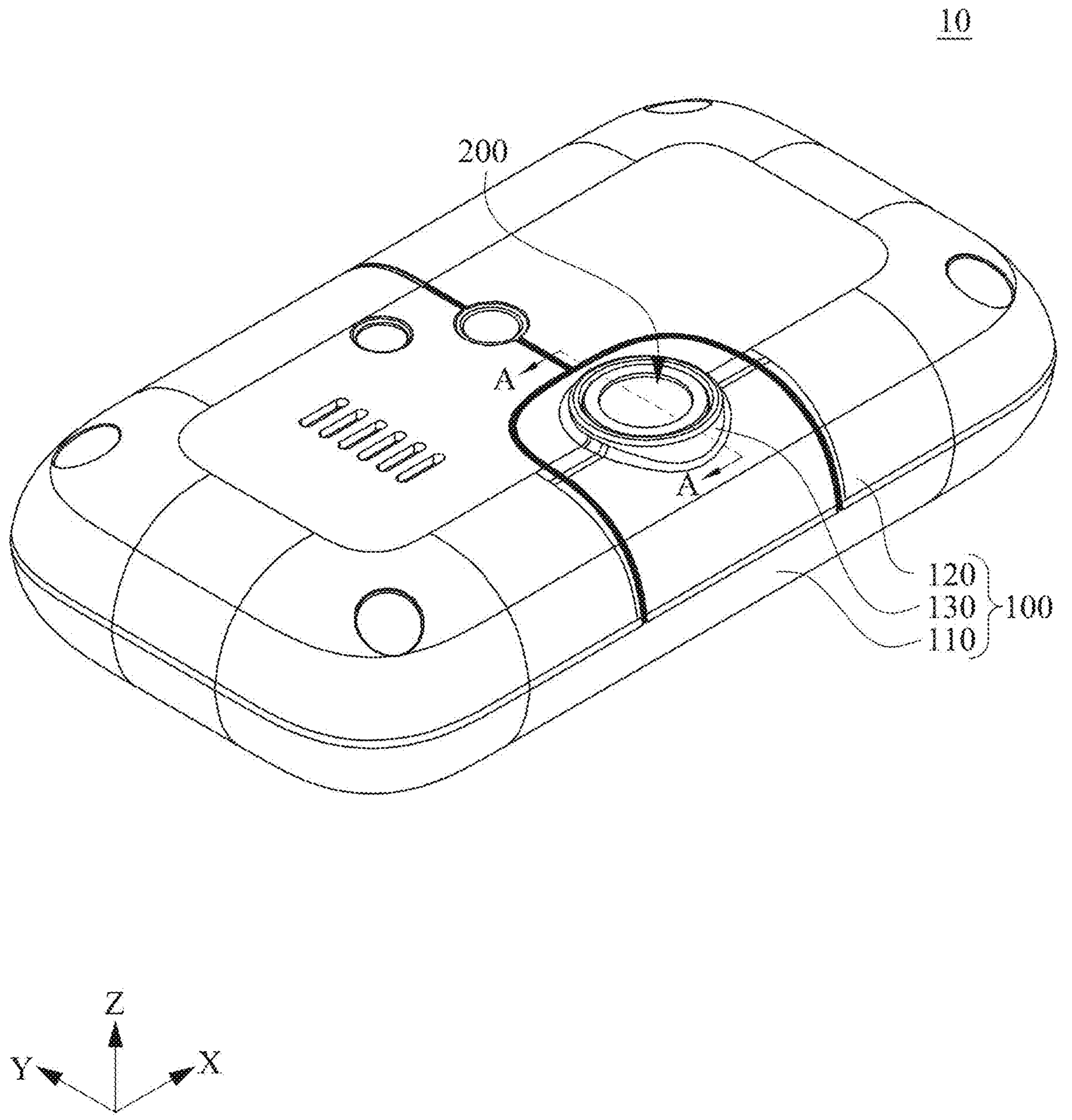
FIG. 1 is a schematic side view of an electronic device according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 2:
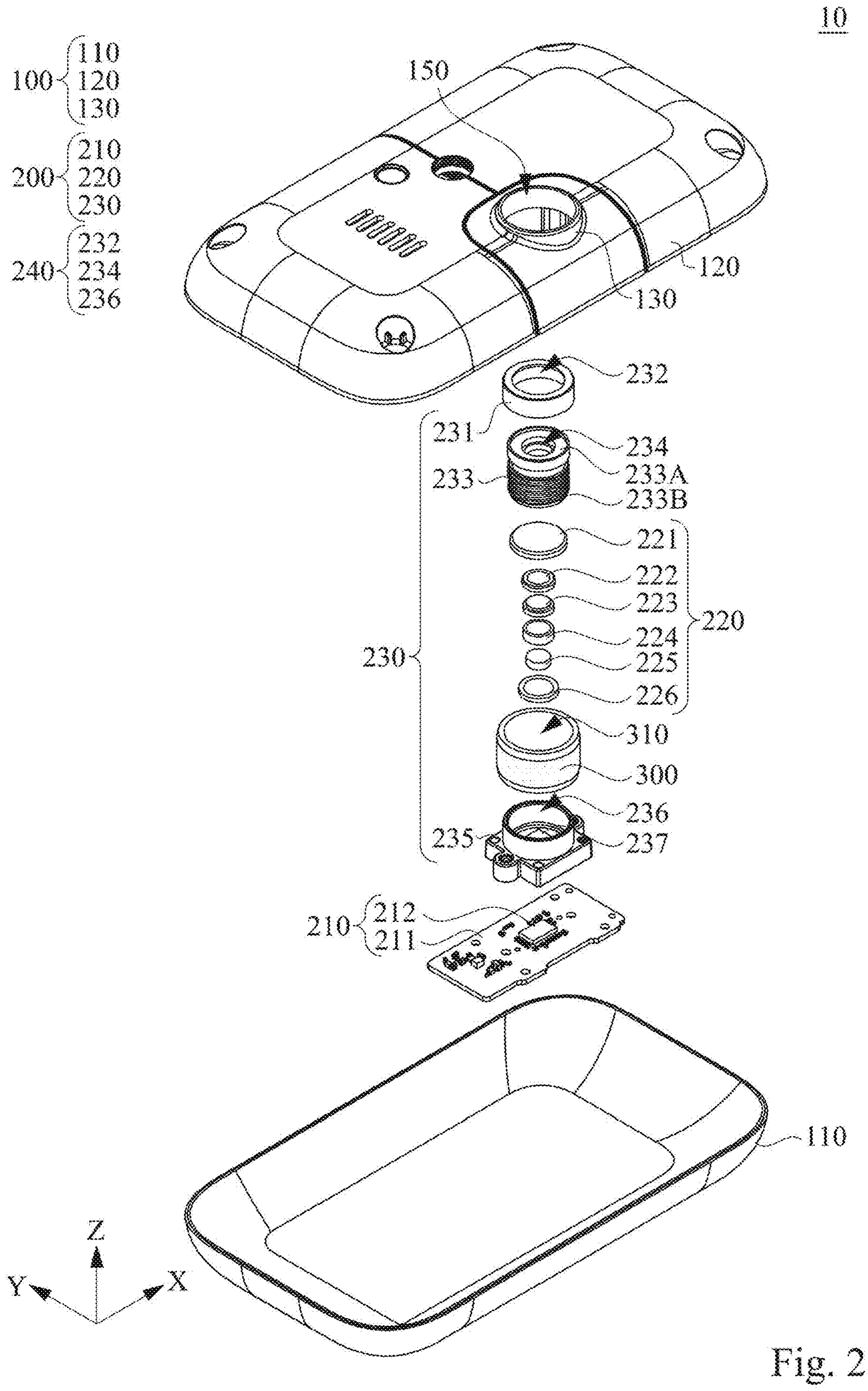
FIG. 2 is an exploded view of the electronic device in FIG. 1.
Figure 3:
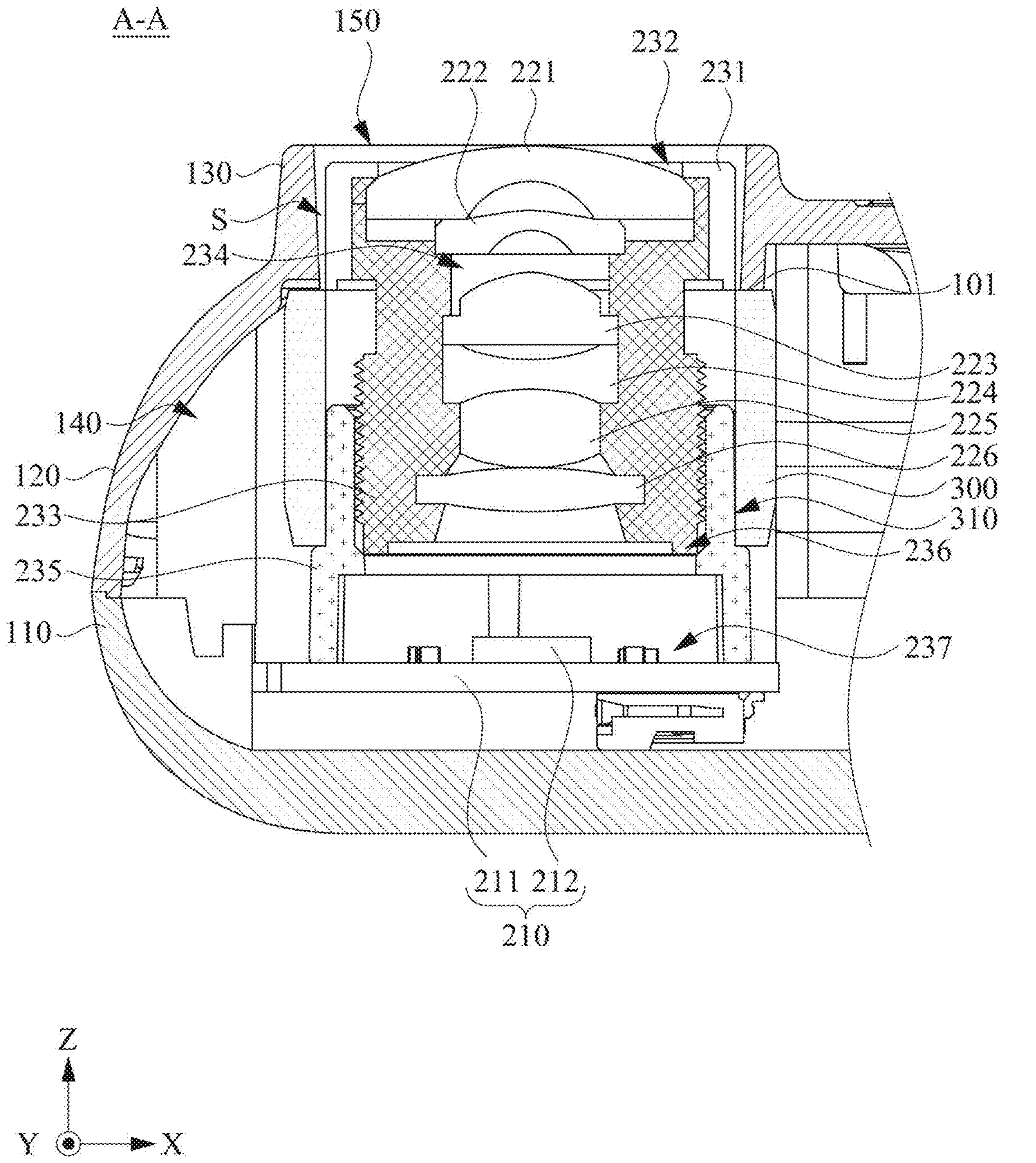
FIG. 3 is a cross-sectional view of the electronic device viewed along a line AA of FIG. 2.

Reference is now made to FIG. 1 to FIG. 3, in which FIG. 1 is a schematic side view of an electronic device 10 according to one embodiment of the present disclosure, FIG. 2 is an exploded view of the electronic device 10 in FIG. 1. FIG. 3 is a cross-sectional view of the electronic device 10 viewed along a line AA of FIG. 2, and the line AA is parallel to a Y-axis. As shown in FIG. 1 to FIG. 3, in this embodiment, an electronic device 10 includes a housing 100, a camera module 200 and an insulating sleeve 300. The housing 100 includes an installation opening 150 and an internal space 140 connected to the installation opening 150. The camera module 200 is located within the installation opening 150 and the internal space 140 together. One part of the camera module 200 is exposed from the installation opening 150. The insulating sleeve 300 is flexible, and surroundingly covers on an outer surface of the camera module 200, and located between the camera module 200 and the housing 100 for blocking the communication between the internal space 140 and the installation opening 150. That is, the camera module 200 passes through a through hole 310 of the insulating sleeve 300 and the installation opening 150.

Specifically, as shown in FIG. 2 and FIG. 3, the housing 100 includes a first casing 110, a second casing 120 and a protrusion portion 130. The first casing 110 and the second casing 120 are able to be combined together so that the aforementioned internal space 140 can be defined by the first casing 110 and the second casing 120 therebetween. The protrusion portion 130 protrudes from one side of the second casing 120 facing away from the first casing 110. The installation opening 150 penetrates through the protrusion portion 130 longitudinally to be in communication with the internal space 140. It is noted, as long as the second casing 120 and the first casing 110 can be combined with each other, the characteristics of the first casing 110 will not be restricted in the disclosure.

In the embodiment, as shown in FIG. 3, the camera module 200 includes a photosensitive assembly 210, a lens set 220 and a support assembly 230. The photosensitive assembly 210 is fixed within the internal space 140. The support assembly 230 is non-conductive and located within the internal space 140 and the installation opening 150. The lens set 220 is supported and positioned by the support assembly 230 so that the lens set 220 is optically coupled to the photosensitive assembly 210 and exposed from the installation opening 150.

It is noted, since the support assembly 230 is an electrostatic protection casing such as plastic product which is made of non-conductive materials, static electricity cannot be transmitted into the internal of the electronic device 10 through the support assembly 230, thereby reducing the risk of damage to the electronic elements in the electronic device 10.

Specifically, the photosensitive assembly 210 includes a circuit board 211 and an image sensing unit 212. The circuit board 211 is located in the internal space 140 and extended along a plane direction of X-Y axis. The image sensing unit 212 is soldered on the circuit board 211 and the image sensing unit 212 overlaps the protrusion portion 130 in the vertical direction (e.g., Z axis). The image sensing unit 212 has an optical axis (e.g., Z axis), and the optical axis (e.g., Z axis) is parallel to a protruding direction (e.g., Z axis) of the protrusion portion 130.

The lens set 220 includes a plurality of lenses (e.g., a first lens 221, a second lens 222, a third lens 223, a fourth lens 224, a fifth lens 225 and a sixth lens 226). The support assembly 230 is formed with a penetrating channel 240 therein. These lenses are sequentially arranged along the optical axis (e.g., Z axis) of the photosensitive assembly 210, and stacked and positioned within the penetrating channel 240 of the support assembly 230. It is noted, these lenses (e.g., the first lens 221, the second lens 222, the third lens 223, the fourth lens 224, the fifth lens 225 and the sixth lens 226) are different from each other in types and sizes. Each of these lenses has different optical operations, however, this disclosure is not limited thereto.

In the embodiment, the support assembly includes a front cover 231, a sleeve body 233 and a bottom cover 235. The front cover 231 is located within the installation opening 150, and a gap S is formed between the front cover 231 and an inner wall of the protrusion portion 130. The bottom cover 235 covers the photosensitive assembly 210, and the sleeve body 233 is connected to the front cover 231 and the bottom cover 235.

For example, the front cover 231 is formed with a first through hole 232, the sleeve body 233 is formed with a second through hole 234, and the bottom cover 235 is formed with an upper receiving area 236 and a lower receiving area 237 which are communicated with each other. The second through hole 234 is collectively communicated with the first through hole 232 and the upper receiving area 236 so as to jointly form the aforementioned penetrating channel 240. The bottom cover 235 covers the circuit board 211 and the image sensing unit 212 so that the image sensing unit 212 is located in the lower receiving area 237. An upper end 233A of the sleeve body 233 extends into the first through hole 232 of the front cover 231, and a lower end 233B of the sleeve body 233 extends into the upper receiving area 236 of the bottom cover 235.

At this moment, the first lens 221 to the sixth lens 226 are sequentially stacked within the second through hole 234 of the sleeve body 233, and the first lens 221 is exposed from the upper end 233A of the sleeve body 233. The first lens 221 and the second lens 222 are located in the first through hole 232 of the front cover 231 and positioned by the front cover 231. In addition, the insulating sleeve 300 is jacketed on the front cover 231 and the bottom cover 235 together, and one side of the insulating sleeve 300 jointly abuts the front cover 231 and the inner surface 101 of the housing 100, and the other side thereof abuts the bottom cover 235.

In this embodiment, as shown in FIG. 3, since the insulating sleeve 300 directly covers the above-mentioned gap S, and the insulating sleeve 300 is an electrostatic protection collar or electrical insulating collar. For example, the insulating sleeve 300 is plastic material collar (e.g., rubber O-ring, a silicone O-ring, and a plastic O-ring, etc.) or a wrapping tape. Therefore, static electricity cannot be passed into the internal space 140 through the gap S, thereby slowing down the damage to internal electronic elements. However, the disclosure is not limited thereto.

As long as the communication between the internal space and the installation opening can be blocked, in other embodiments, it is also possible to dispose the insulating sleeve in the installation opening so that it is sandwiched between the inner wall of the protrusion portion 130 and the front cover (not shown in figures).

Thus, through the construction of the embodiments above, the electronic device of the disclosure is not only waterproof and dustproof, but also can reduce static electricity from entering the interior of the electronic device during ESD testing, thereby slowing down the damage to internal electronic elements.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure covers modifications and variations of this disclosure provided they fall within the scope of the following claims and their equivalents.

What is claimed is:

1. An electronic device, comprising:

a housing comprising a first casing, a second casing combined with the first casing together to define an installation opening therein, a protrusion portion protruding from one side of the second casing facing away from the first casing, and an internal space connected to the installation opening, the installation opening penetrating through the protrusion portion longitudinally;

a camera module located within the installation opening and the internal space, and exposed from the installation opening; and an insulating sleeve surroundingly covered an outer surface of the camera module and located between the camera module and the housing for blocking a communication between the internal space and the installation opening, wherein the insulating sleeve is located within the internal space to directly cover an inner surface of the second casing and a gap formed between the camera module and an inner wall of the protrusion portion.

2. The electronic device of claim 1, wherein the camera module comprising:

a photosensitive assembly fixed within the internal space;

a support assembly which is non-conductive, and located within the installation opening and the internal space; and a lens set supported and positioned by the support assembly so that the lens set is optically coupled to the photosensitive assembly and exposed from the installation opening.

3. The electronic device of claim 2, wherein the support assembly is formed with a penetrating channel therein, and the lens set comprises a plurality of lenses sequentially stacked and positioned within the penetrating channel and arranged along an optical axis of the photosensitive assembly.

4. The electronic device of claim 2, wherein the support assembly comprising:

a front cover located within the installation opening;

a bottom cover covering the photosensitive assembly; and a sleeve body connected to the front cover and the bottom cover, wherein the insulating sleeve is jacketed on the bottom cover and abutted against the bottom cover and an inner surface of the housing, respectively.

5. The electronic device of claim 4, wherein the lens set comprises a first lens, a second lens, a third lens, a fourth lens, a fifth lens and a sixth lens, which are sequentially stacked within the support assembly, wherein the first lens, the second lens, the third lens, the fourth lens, the fifth lens and the sixth lens are sequentially stacked within the sleeve body, and the first lens is exposed from one end of the sleeve body.

6. The electronic device of claim 2, wherein the support assembly is a plastic product.

7. The electronic device of claim 1, wherein the insulating sleeve is one of a rubber O-ring, a silicone O-ring, and a plastic O-ring.

8. An electronic device, comprising:

a housing comprising a first casing, a second casing combined with the first casing together to define an installation opening therein, and an internal space connected to the installation opening;

a protrusion portion protruding from one side of the second casing facing away from the first casing, wherein the installation opening penetrates through the protrusion portion longitudinally;

an electrostatic protection collar located within the internal space; and a camera module located within the internal space, and disposed within a through hole of the electrostatic protection collar and the installation opening, and exposed from the installation opening, wherein the electrostatic protection collar is located within the internal space to directly cover an inner surface of the second casing and a gap formed between an inner wall of the protrusion portion and the camera module for blocking a communication between the internal space and the installation opening.

9. The electronic device of claim 8, wherein the camera module comprising:

a photosensitive assembly fixed within the internal space;

a support assembly which is non-conductive, and located within the installation opening and the internal space; and a lens set supported and positioned by the support assembly so that the lens set is optically coupled to the photosensitive assembly and exposed from the installation opening.

10. The electronic device of claim 9, wherein the support assembly is formed with a penetrating channel therein, and the lens set comprises a plurality of lenses sequentially stacked and positioned within the penetrating channel and arranged along an optical axis of the photosensitive assembly, wherein a first one of the lenses is exposed from one end of the penetrating channel.

11. The electronic device of claim 9, wherein the support assembly comprising:

a front cover located within the installation opening;

a bottom cover covering the photosensitive assembly; and a sleeve body connected to the front cover and the bottom cover, wherein the electrostatic protection collar is jacketed on the bottom cover and abutted against the bottom cover and an inner surface of the housing, respectively.

* * * * *